(12) United States Patent
Funahashi et al.

(10) Patent No.: US 8,175,344 B2
(45) Date of Patent: May 8, 2012

(54) FINGERPRINT MATCHING PROCESSOR

(75) Inventors: Takeshi Funahashi, Saitama (JP); Hideaki Hanaoka, Kanagawa (JE); Sung-Kil Lee, Miyagi (JP)

(73) Assignee: Sony Corporation, Tokyo (JP)

( * ) Notice: Subject to any disclaimer, the term of this patent is extended or adjusted under 35 U.S.C. 154(b) by 1631 days.

(21) Appl. No.: 10/909,333

(22) Filed: Aug. 3, 2004

(65) Prior Publication Data
US 2005/0226476 A1    Oct. 13, 2005

(30) Foreign Application Priority Data
Aug. 5, 2003    (JP) ................................. 2003-287212

(51) Int. Cl.
G06K 9/00    (2006.01)
(52) U.S. Cl. ........................................ 382/124; 382/125
(58) Field of Classification Search .................. None
See application file for complete search history.

(56) References Cited

U.S. PATENT DOCUMENTS

| | | | | | |
|---|---|---|---|---|---|
| 3,555,369 | A * | 1/1971 | Yoshino | ......................... | 361/512 |
| 4,019,200 | A * | 4/1977 | Adkins et al. | ................. | 257/254 |
| 4,577,345 | A * | 3/1986 | Abramov | ...................... | 382/124 |
| 5,325,442 | A * | 6/1994 | Knapp | ........................... | 382/124 |
| 5,583,076 | A * | 12/1996 | Yoshizawa et al. | ............. | 438/64 |
| 5,844,286 | A * | 12/1998 | Hase | .............................. | 257/417 |
| 5,922,550 | A * | 7/1999 | Everhart et al. | .............. | 435/7.21 |
| 5,956,415 | A * | 9/1999 | McCalley et al. | ............. | 382/124 |
| 5,978,496 | A | 11/1999 | Harkin | | |
| 6,002,786 | A * | 12/1999 | Hallibert et al. | .............. | 382/124 |
| 6,091,838 | A * | 7/2000 | Burrows et al. | ............... | 382/124 |
| 6,122,737 | A * | 9/2000 | Bjorn et al. | .................... | 713/186 |
| 6,181,807 | B1 * | 1/2001 | Setlak et al. | ................... | 382/124 |
| 6,234,031 | B1 * | 5/2001 | Suga | ......................... | 73/862.474 |
| 6,310,683 | B1 * | 10/2001 | Fujiwara et al. | ................ | 356/71 |
| 6,411,726 | B1 * | 6/2002 | Pires | ................................ | 382/124 |
| 6,462,563 | B1 * | 10/2002 | Kawahara et al. | ............ | 324/690 |
| 6,828,805 | B2 * | 12/2004 | Izumi et al. | ..................... | 324/686 |
| 6,960,790 | B2 * | 11/2005 | Miyai et al. | ...................... | 257/77 |
| 6,980,673 | B2 * | 12/2005 | Funahashi | ...................... | 382/124 |
| 6,987,871 | B2 * | 1/2006 | Kalnitsky et al. | ............. | 382/124 |
| 7,031,500 | B1 * | 4/2006 | Shinohara | ...................... | 382/124 |
| 7,214,528 | B1 * | 5/2007 | Vandenbark et al. | ....... | 435/283.1 |

(Continued)

FOREIGN PATENT DOCUMENTS

JP    10-26703    1/1989

(Continued)

OTHER PUBLICATIONS http://www.tf.uni-kiel.de/matwis/amat/semitech_en/kap_6/backbone/r6_6_1.html.*

(Continued)

*Primary Examiner* — Michelle Entezari
(74) *Attorney, Agent, or Firm* — Rader Fishman & Grauer, PLLC

(57) ABSTRACT

In a fingerprint matching processor which has an electrostatic capacity semiconductor sensor 14 for detecting fingerprint information based on electrostatic capacities between a plurality of detection electrodes 21 arranged on a semiconductor substrate 24 at a predetermined interval in a two dimensional manner and a target object, and which executes a fingerprint matching process for the detected fingerprint information, a water repellent film 30 is formed on a protective film 26, the protective film 26 protecting ground electrodes 22 that are disposed between the detection electrodes 21 and configured to ground the target object and the detection electrodes 21, and serves as a surface of the semiconductor sensor 14 for placement of the target object.

23 Claims, 11 Drawing Sheets

U.S. PATENT DOCUMENTS

| | | | |
|---|---|---|---|
| 2001/0055411 A1* | 12/2001 | Black | 382/124 |
| 2002/0023492 A1* | 2/2002 | Sakai et al. | 73/514.16 |
| 2002/0030359 A1* | 3/2002 | Bergenek et al. | 283/68 |
| 2002/0126882 A1* | 9/2002 | Funahashi | 382/124 |
| 2002/0168961 A1* | 11/2002 | Ohba | 455/410 |
| 2003/0074577 A1* | 4/2003 | Bean et al. | 713/200 |
| 2003/0103686 A1* | 6/2003 | Ogura | 382/321 |
| 2003/0178714 A1* | 9/2003 | Sakoda et al. | 257/680 |
| 2004/0190761 A1* | 9/2004 | Lee | 382/124 |
| 2005/0275750 A1* | 12/2005 | Akram et al. | 348/374 |
| 2009/0186060 A1* | 7/2009 | Hainfeld et al. | 424/422 |
| 2010/0103288 A1* | 4/2010 | Ahn et al. | 348/231.99 |

FOREIGN PATENT DOCUMENTS

| | | |
|---|---|---|
| JP | 03-038621 | 2/1991 |
| JP | 09-255919 | 9/1997 |
| JP | 10-133001 | 5/1998 |
| JP | 11-508806 T | 8/1999 |
| JP | 2000-196027 A | 7/2000 |
| JP | 2002-071307 A | 3/2002 |
| JP | 2003-287212 | 10/2003 |

OTHER PUBLICATIONS

Organic Field-Effect Transistors, Edited by Zhenan Bao and Jason Locklin CRC Press 2007 pp. 229-251 Print ISBN: 978-0-8493-8080-8 eBook ISBN: 978-1-4200-0801-2 DOI: 10.1201/9781420008012.ch3.2.*

Japanese Office Action issued Dec. 8, 2009 for corresponding Japanese Application No. 2003-287212.

* cited by examiner

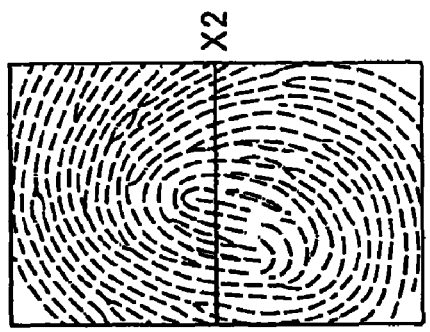
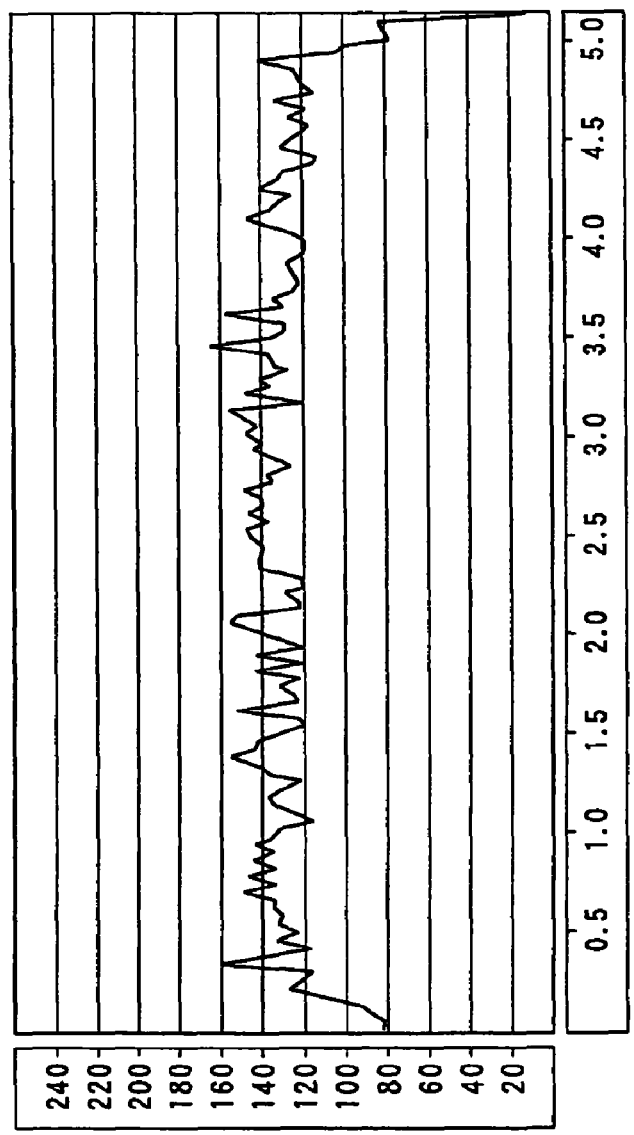
FIG. 8B
FIG. 8A

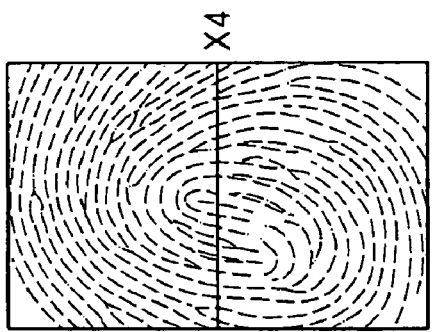
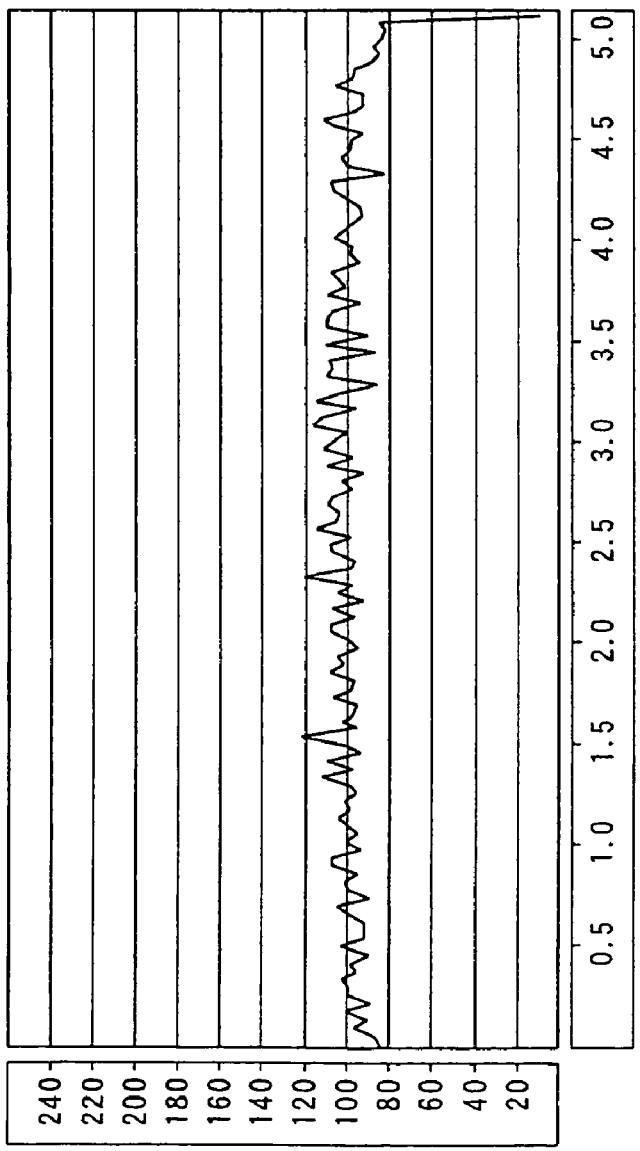
FIG.10B
FIG.10A

FINGERPRINT MATCHING PROCESSOR

This application claims priority of Japanese Patent Application No. 2003-287212, filed on Aug. 5, 2003, the entirety of which is incorporated by reference herein.

BACKGROUND OF THE INVENTION

1. Field of the Invention

The present invention relates to a fingerprint matching processor which has a semiconductor sensor for reading out fingerprint information through the difference in electrostatic capacities and executes a fingerprint information matching process, and more particularly, to a fingerprint matching processor capable of preventing illegal fingerprint matching.

2. Description of the Related Art

A fingerprint matching processor that is configured to read out fingerprint information by means of a fingerprint sensor and check the read out fingerprint information for user identification has been known.

In such a fingerprint matching processor, fingerprint matching using illegally obtained fingerprint information is often conducted. For example, when the fingerprint matching process is performed with a finger placed on a sensor surface of the fingerprint matching processor, dirt, such, as oil on the finger adheres to the sensor surface after the process. This dirt may be used for illegal fingerprint matching.

To prevent such an irregularity, the fingerprint matching processor is configured to determine whether the finger is placed on the sensor surface at the time of the fingerprint matching process and to execute the fingerprint matching process depending on the determination result.

More specifically, when it cannot be determined with certainty whether the finger has come in contact with the sensor surface during a reading operation of fingerprint information, the fingerprint matching processor repeats the reading operation to detect a change in the read out fingerprint information, thereby determining whether the finger has been placed on the sensor surface.

As described above, in the fingerprint matching processor, the matching process of the fingerprint information read out by means of a fingerprint sensor is not started until the placement of the finger on the sensor surface has been determined. As is known, the fingerprint information differs between individuals. Therefore, by employing the method in which the fingerprint matching process is stated after confirmation of placement of the finger on the sensor surface, it can be determined that the fingerprint information read out by means of the sensor is the information inherent to the living organism (human), which makes it possible to identify the individual uniquely.

Further, some fingerprint matching processors have been designed to have a living organism detection means for the determination of the placement of the finger on the sensor surface (refer to Jpn. Pat. Publication No. 3-38621).

However, the above method of determining whether the finger has been placed on the sensor surface by detecting a change in the fingerprint information depends on the condition of the finger or the like. Accordingly, it may be said that this method lacks validity and is an extremely unstable determination method.

Further, in the method using the living organism detection means for the determination of the placement of the finger on the sensor surface, the living organism detection means itself causes the fingerprint matching processor to grow in size and leads to increased cost.

SUMMARY OF THE INVENTION

The present invention has been made to solve the above problems, and an object thereof is to provide a fingerprint matching processor using a semiconductor sensor capable of preventing illegal finger matching with a simple method, and executing the fingerprint matching process with excellent safety and certainty.

To achieve the above object, according to the present invention, there is provided a fingerprint matching processor which has an electrostatic capacity semiconductor sensor for detecting fingerprint information based on electrostatic capacities between a plurality of detection electrodes arranged on a semiconductor substrate at a predetermined interval in a two-dimensional manner and a target object, and executes a fingerprint matching process for the detected fingerprint information, comprising: a water repellent film on a protective film, the protective film protecting ground electrodes that are disposed between the detection electrodes and configured to ground the target object and the detection electrodes, and serving as a surface of the semiconductor sensor for placement of the target object.

In the present invention, a water repellent film is formed on a protective film, which protects a plurality of detection electrodes arranged on a semiconductor substrate of an electrostatic capacity semiconductor sensor at a predetermined interval in a two-dimensional manner and ground electrodes for grounding a target object.

As a result, the water repellency of the water repellent film prevents the fingerprint matching process from being erroneously executed for a foreign matter adhering to the water repellent film, enabling execution of the fingerprint matching process with excellent safety and certainty. Since it is possible to prevent the fingerprint matching process from being erroneously executed for a foreign matter adhering to the water repellent film, the gain of the semiconductor sensor can be increased, so that a fingerprint matching processor capable of handling dry skin or the like, a fingerprint of that is not detected easily, can be obtained.

Further, solving an alkoxysilane compound represented by general formulas (1) and (2), to be described later, in a fluorinated hydrocarbon based solvent allows a user to coat the protective film with the water repellent film by himself. Thus, it can be said that the water repellent film is formed on the protective film with a simple method.

BRIEF DESCRIPTION OF THE DRAWINGS

FIG. 8A shows a waveform detected by the fingerprint reading sensor in the case of blowing breath against the foreign matter adhering to the protective film without being coated with a water repellent film, and FIG. 8B shows the foreign matter adhering to the protective film;

FIG. 10A shows a waveform detected by the fingerprint reading sensor in the case of blowing breath against the foreign matter adhering to the water repellent film coated on the protective film, and FIG. 10B shows the foreign matter adhering to the water repellent film;

DETAILED DESCRIPTION OF THE PREFERRED EMBODIMENTS

A fingerprint matching processor according to a preferred embodiment of the present invention will be described below with reference to the accompanying drawings.

First, with reference to FIGS. 1 and 2, a fingerprint matching processor 10 according to the preferred embodiment of the present invention will be described.

Figure 1:
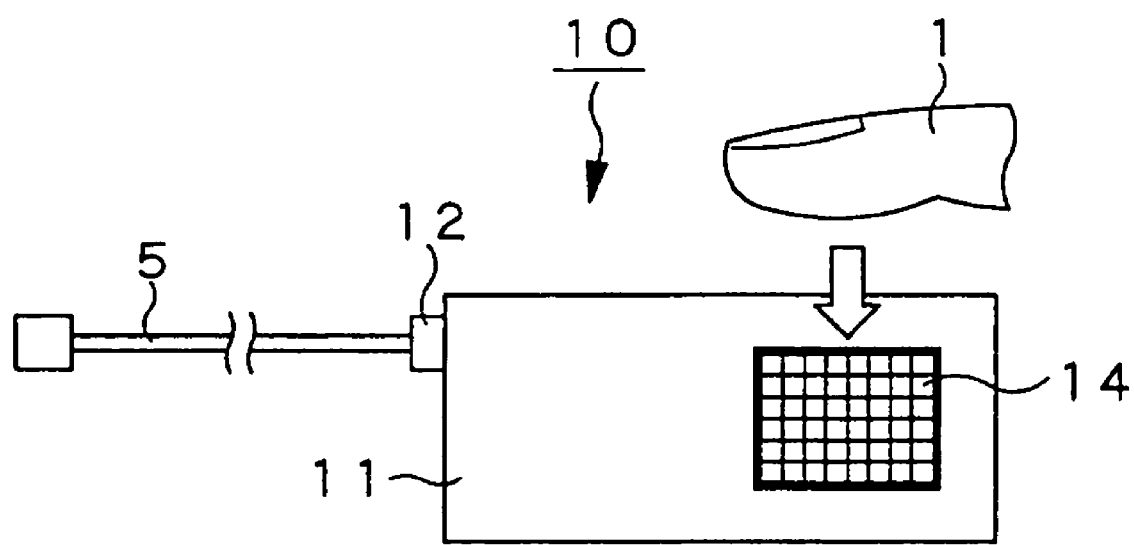
FIG. 1 schematically shows a fingerprint matching processor exemplified as an embodiment of the present invention.

FIG. 1 schematically shows the fingerprint matching processor 10.

A casing 11 of the fingerprint matching processor 10 includes a fingerprint reading sensor 14 that is configured to read out fingerprint information of the finger, which is a target object of the fingerprint matching process, in a state where the finger is placed on a surface thereof. A sensor surface of the fingerprint reading sensor 14 is coated with a water repellent film.

The fingerprint matching processor 10 includes an I/O interface 12, through which the processor 10 is connected to an external device such as a PC (Personal computer—not shown) by a cable 5. Results of the fingerprint matching or the like are transmitted through the I/O interface 12 to the device.

A configuration of the fingerprint matching processor 10 will be described next with reference to FIG. 2.

The fingerprint matching processor 10 includes the I/O interface 12, an interface controller 13, the fingerprint reading sensor 14, an LSI (Large Scale Integration) for fingerprint matching 15, a flashmemory 16, RAM/ROM (Random Access Memory/Read Only Memory) for program 17, and a CPU (Central Processing Unit) 18.

The interface controller 13, LSI for fingerprint matching 15, flashmemory 16, RAM/ROM for program 17, and CPU 18 are connected between them via a bus 19.

The I/O interface 12 is, for example, an interface conforming to USB (Universal Serial Bus) specifications. The interface 12 may be an interface conforming to RS232C. Thus, the specification of the interface is not meant to limit the present invention.

The interface controller 13 controls data transfer between the fingerprint matching processor 10 and the external device (not shown), which are connected to each other via the I/O interface 12, according to the interface protocol.

The fingerprint reading sensor 14 is a semiconductor sensor that reads out pits and projections of the fingerprint of the finger placed thereon.

Figure 3:
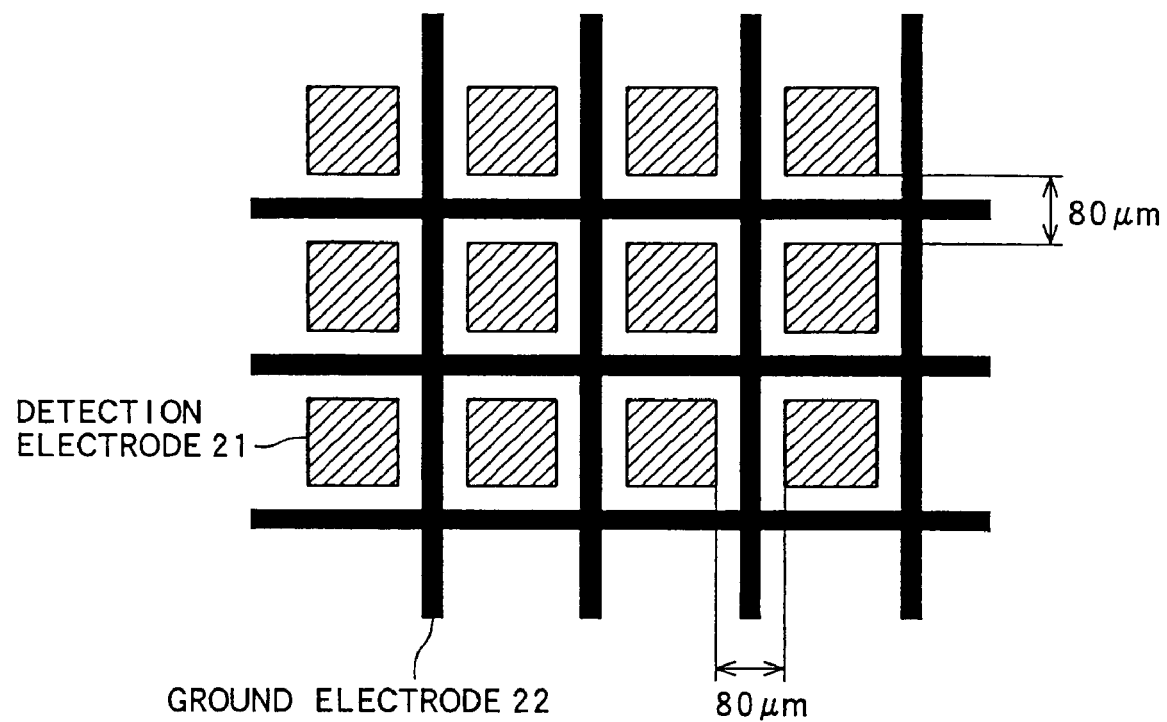
FIG. 3 is a view for explaining detection electrodes and ground electrodes included in a fingerprint reading sensor.

For example, the fingerprint reading sensor 14 detects pits and projections of the fingerprint with the electrostatic capacity method and generates a two-dimensional image. The fingerprint reading sensor 14 using the electrostatic capacity method has, as shown in FIG. 3, detection electrodes 21 arranged in a two-dimensional matrix at a pitch of 80 μm, which is finer than the pitch between pit and projection of the fingerprint, and thereby detects the quantity of electric charge (electrostatic capacity) accumulated between pits and projections of the fingerprint and respective detection electrodes 21. That is, capacitors are formed between pits and projections of the fingerprint and respective detection electrodes 21. A low electrostatic capacity is detected at pit portions of the fingerprint, whereas a high electrostatic capacity is detected at the projection portions. As a result, a two-dimensional image representing pits and projections of the fingerprint is generated based on the difference between the electrostatic capacities.

Further, as shown in FIG. 3, disposed in a lattice form between the two-dimensionally arranged detection electrodes 21 are ground electrodes 22 which allow the finger, which is the target object, placed on the fingerprint reading sensor 14 to connect to ground.

When the ground electrodes 22 are disposed between the detection electrodes 21 as shown in FIG. 3, the finger grounded by the ground electrodes 22 and respective detection electrodes 21 are uniformly coupled, thereby eliminating the influence of electric charge accumulated in the human body. As a result, the S/N ratio of the electric signal representing pits and projections of the fingerprint, the signal being caused by electric charge accumulated in the capacitors formed between the pits and projections of the fingerprint and respective detection electrodes 21, is increased, thereby obtaining a two-dimensional image having a high contrast ratio.

Figures 4A, 4B:
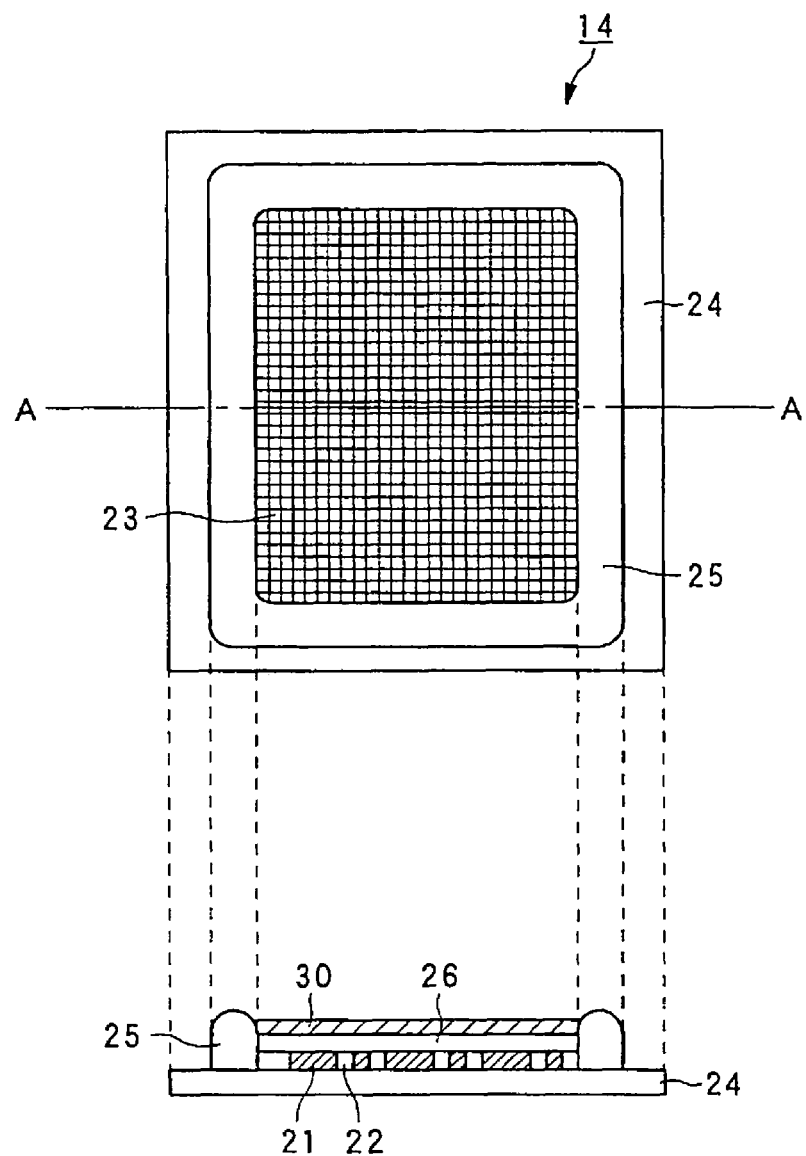
FIG. 4A is a front view of the fingerprint reading sensor.
FIG. 4B is a vertical cross-sectional view of the fingerprint reading sensor.

A sensor surface of the fingerprint reading sensor 14 is coated with a water repellent film, as described above. The fingerprint reading sensor 14, which has the outer appearance as shown in FIG. 4A, is formed on a substrate 24, such as a silicon wafer. The sensor surface 23 is molded and sealed with a mold portion 25 made of a thermoplastic mold resin, and coated with a water repellent film.

FIG. 4B shows a cross-sectional view of the fingerprint reading sensor 14 taken along A-A line of FIG. 4A. The fingerprint reading sensor 14 is configured as follows. Formed on the substrate 24 through an interlayer film (not shown) are the detection electrodes 21 arranged at a pitch of 80 μm in a two-dimensional matrix and the ground electrodes 22 disposed between the detection electrodes 21 in a lattice form, as shown in FIG. 4B. The surface of the two electrodes is overcoated with a protective film 26.

The protective film 26 using silicon nitride is formed by a spin coating method. A DLC (Diamond Like Carbon) also can be used as the protective film 26. Formed on the protective film 26 is the sensor surface 23 to be coated with a water repellent film 30, which will be described in detail later.

Figure 2:
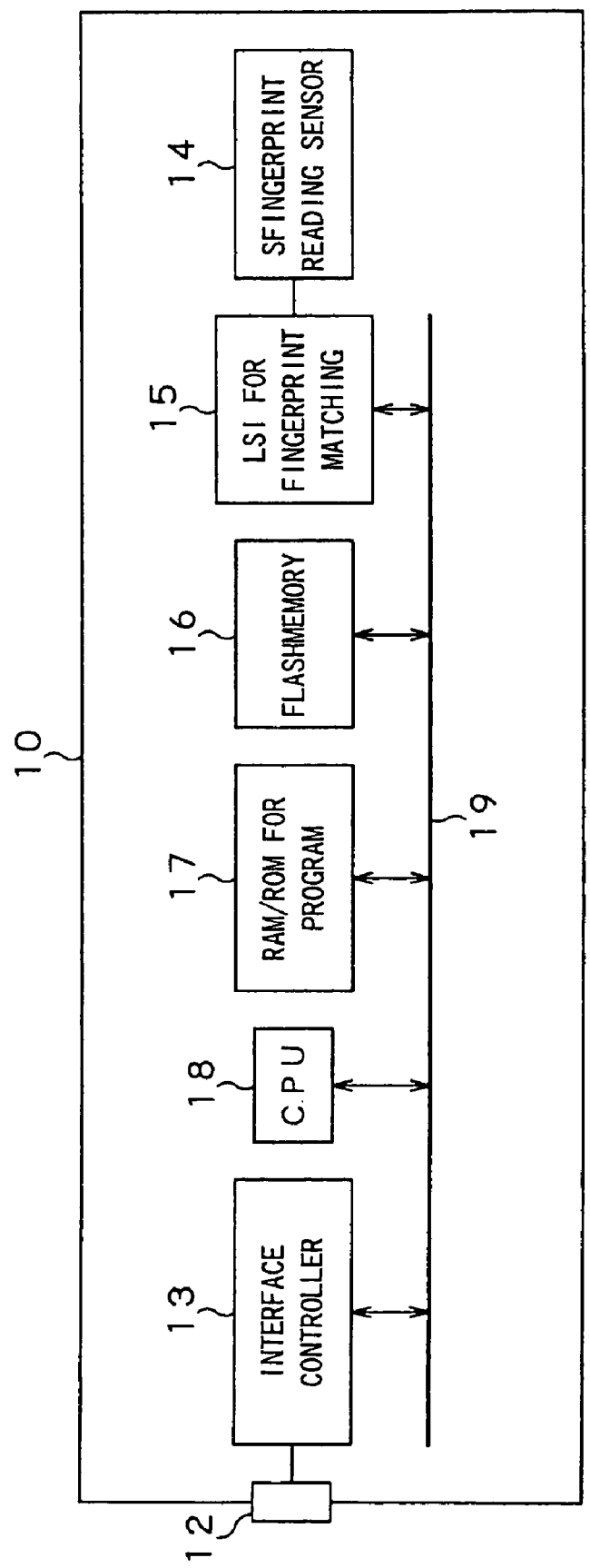
FIG. 2 is a block diagram for explaining a configuration of the fingerprint matching processor.

The description of the configuration of fingerprint matching processor 10 is continued with reference to FIG. 2. The LSI for fingerprint matching 15 reads out, during the fingerprint matching process, template data obtained by extracting only a characterizing portion in the fingerprint image previously stored in the flashmemory 16, and compares and matches the read out template data with the fingerprint image detected by the fingerprint reading sensor 14. The result of the matching obtained in the LSI for fingerprint matching 15 is transmitted to the CPU 18.

The flashmemory 16 stores template data, which is fingerprint information serving as a reference in the fingerprint matching process. When the fingerprint matching process is executed using the fingerprint matching processor 10, a user must previously register his or her fingerprint information in the flashmemory 16. The fingerprint information that is stored in the flashmemory 16 is the template data obtained by extracting a characterizing portion in the fingerprint image.

The flashmemory 16 included in the fingerprint matching processor 10 may have a storage area from which the stored data can be read depending on the result of the fingerprint matching obtained in the fingerprint matching process executed by the fingerprint reading sensor 14 and the LSI for fingerprint matching 15.

The CPU 18 executes firmware stored in the RAM/ROM for program 17 to exercise a comprehensive control over the operation of the fingerprint matching processor 10. The CPU 18 allows the fingerprint matching processor 10 to execute the fingerprint matching process based on the firmware.

Next, the aforementioned water repellent film 30 coated on the protective film 26 of the fingerprint reading sensor 14 will be described in detail.

Figure 5:
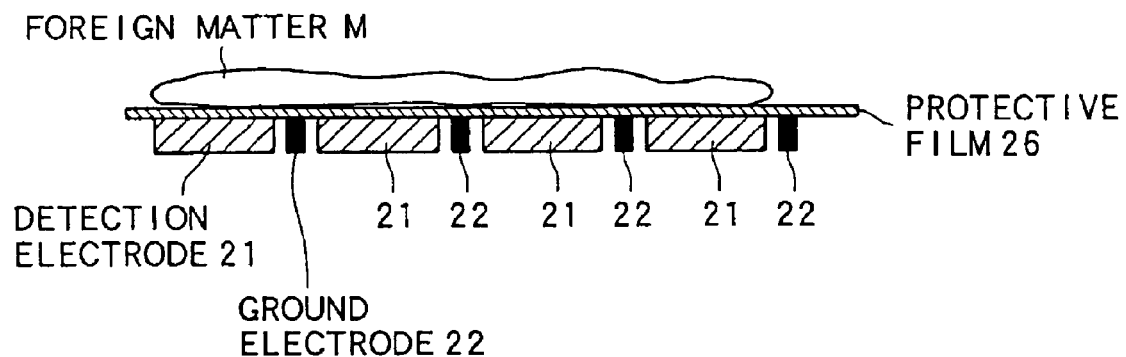
FIG. 5 is a view for explaining the case where a foreign matter is placed on the protective film that is not coated with a water repellent film.

First, the advantage that can be obtained by coating the protective film 26 with the water repellent film 30 will be described. In the case of using the protective film 26 on which the water repellent film 30 is not coated, when the finger is once put on the protective film 26 and then lifted off the film, a foreign matter M such as dirt that has been attached to the finger or moisture including oil or sweat is left on the protective film 26, as shown in FIG. 5. The foreign matter M is dirt that has attached to the projection portion of the fingerprint of the finger that came in contact with the protective film 26 or sweat that comes from sweat glands in the projection portion and, therefore, has and maintains the shape of fingerprint.

As shown in FIG. 5, the foreign matter M is present across the detection electrodes 21 and ground electrodes 22 on the protective film 26 that is not coated with the water repellent film 30, as if the finger were placed on the protective film 26. In other words, the foreign matter M is grounded by the ground electrodes 22 and coupled with the respective detection electrodes 21.

Then, the fingerprint reading sensor 14 may erroneously read out the electric charge of the foreign matter M adhering to the protective film 26, and the LSI for fingerprint matching 15 accordingly executes the fingerprint matching process.

Figure 6:
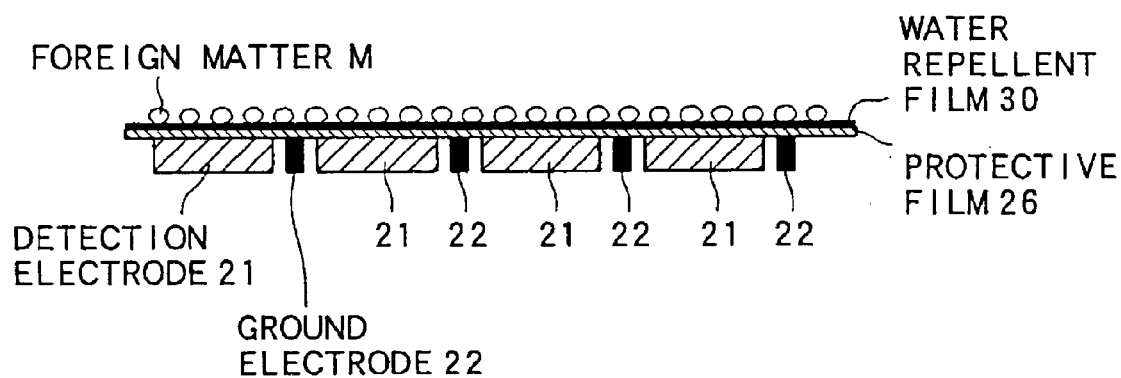
FIG. 6 is a view for explaining the case where a foreign matter is placed on the protective film coated with a water repellent film.

On the other hand, it is assumed that the protective film 26 coated with the water repellent film 30 is used as shown in FIG. 6. In this case, the foreign matter M, which has been caused by once putting the finger on the water repellent film 30 and lifting the finger off the film 30, is presumed to become fine particles each having a diameter of 80 μm or less due to the water repellency of the water repellent film 30. The foreign matter M that has become fine particles is grounded by the ground electrodes 22 and are not coupled with the detection electrodes 21. Therefore, in the case of using the protective film 26 coated with a water repellent film 30, the two-dimensional image generated by the electric charge of the foreign matter M read out by the fingerprint reading sensor 14 results in a worse S/N ratio. This may prevent the foreign matter M from being subjected to fingerprint matching executed by the LSI for fingerprint matching 15.

As a result, by coating the protective film 26 of the fingerprint reading sensor 14 included in the fingerprint matching processor 10 with the water repellent film 30, it is possible to prevent illegal fingerprint matching and execute fingerprint matching process with excellent safety and certainty.

Constituent materials of the water repellent film 30 to be coated on the protective film 26 and coating method thereof will next be described below. The water repellent film 30 includes, literally, materials exhibiting water repellency. It is necessary for the water repellent film 30 to have a film thickness that secures a high adhesiveness to the protective film 26 and that does not have an influence on sensor sensibility of the fingerprint reading sensor 14.

The water repellent film 30 can be formed by using an alkoxysilane compound having a perfluoropolyether group represented by the following general formula (1) disclosed in Jpn. Pat. Appln. Laid-Open Publication No. 9-255919.

$$R_f\{COR^1\text{---}R^2\text{---}Si(OR^3)_3\}_j \quad (1)$$

where $R_f$ denotes a perfluoropolyether group; $R^1$ denotes O or NH or S; $R^2$ denotes an alkylene group; $R^3$ denotes an alkyl group; and j denotes 1 or 2.

Further, when an alkoxysilane compound represented by the following general formula (2) obtained with j in the general formula (1) being 2 is used, the water repellent film 30 having a low friction characteristic can be obtained. Accordingly, the durability in the case of coating the protective film 26 with the water repellent film 30 can be increased.

$$_3(R^3O)Si\text{---}R^2\text{---}R^1CO\text{---}R_f\text{---}COR^1\text{---}R^2\text{---}Si(OR^3)_3 \quad (2)$$

where $R_f$ denotes a perfluoropolyether group; $R^1$ denotes O or NH or S; $R^2$ denotes an alkylene group; and $R^3$ denotes an alkyl group.

Further, the water repellent film 30 can be formed by using a bi-sensory organic silane compound, its partial hydrolysis, or an organic silicon compound disclosed in Jpn. Pat. Appln. Laid-Open Publication No. 10-133001. Alternatively, the water repellent film 30 can be formed by using an organopolysiloxane compound or silazane compound disclosed in Jpn. Pat. Appln. Laid-Open Publication No. 10-26703.

These compounds exhibit water repellency by containing a perfluoropolyether group; and they exhibit strong adhesiveness by being chemically adsorbed to the protective film 26 using a polar group. With these compounds having water repellency, it is possible to form the water repellent film 30 of 500 nm or less film thickness that has little influence on sensor sensitivity of the fingerprint reading sensor 14.

While the molecular weight of the alkoxysilane compound shown in the general formulas (1) and (2) is not particularly limited, it is preferable for the alkoxysilane compound to have a number average molecular weight of about 500 to 10,000, more preferably, about 500 to 4000, in terms of its stability and operability.

Further, while the film thickness of the surface modification film formed by these compounds is not particularly limited, it is preferable for the surface modification film to have a film thickness of 0.1 nm to 500 nm, more preferably, 0.1 nm to 50 nm, in consideration of the balance between the sensor surface of the fingerprint reading sensor 14 and the stationary contact angle of the surface modification film relative to water.

In forming the water repellent film 30 formed of the alkoxysilane compound represented by the above general formulas (1) and (2) on the protective film 26, a coating method in which the alkoxysilane compound is dissolved in a solvent for composition control and is coated on the protective film 26 and a thin-film formation method, such as a vacuum thin-film formation, are available.

More specifically, as the coating method, a spin coating method, dipping coating method, curtain flow coating method and the like are preferably used in terms of uniformity in the film thickness. Further, in terms of workability, preferably used are a method in which an adequate quantity of the dissolved alkoxysilane compound is dropped to the protective film 26 and another method in which a material, such as a paper or cloth impregnated with the dissolved alkoxysilane compound is used for coating.

It is therefore easy to apply a coating on the protective film 26 of the fingerprint reading sensor 14 even after assembly of the fingerprint matching processor 10, which allows a user to form the water repellent film 30 by himself. When the fingerprint matching processor 10 is produced in large quantities, in the manufacturing process of the fingerprint reading senor 14, a mask having an opening only corresponding to the protective film 26 may be used to form the water repellent film 30 by spray injection.

As the thin-film formation method, a vacuum evaporation method, a CVD method, a sputtering method and the like are available. These methods are effective in mass production and in the case where it is intended to control the film thickness. When the water repellent film 30 is formed by thin-film formation methods, the alkoxysilane compound represented by the above general formulas (1) and (2) need not be dissolved in a solvent.

The solvent, in which the alkoxysilane compound represented by the above general formulas (1) and (2) is dissolved in forming the water repellent film 30 on the protective film 26 using the coating method, will be described next. In the coating operation, the alkoxysilane compound represented by the above general formulas (1) and (2) is diluted with a volatile solvent in general and used as a composition for surface modification film. While any solvent can be used for this coating operation, the type of solvent must be determined, for actual use, in the consideration of the stability of the composition, the characteristics of the protective film 26 as the surface to be coated, the wettability and volatility with respect to the material used as the protective film 26. In the present invention, a fluorinated hydrocarbon based solvent is used, in terms of uniformity in coating film.

The fluorinated hydrocarbon based solvent is a compound obtained by replacing a part of or all of the hydrogen atoms of a hydrocarbon based solvent, such as aliphatic hydrocarbon, cyclic hydrocarbon, ether or the like with a fluorine atom For example, product names ZEORORA-HXE (boiling point 78° C.), Perfluoroheptane (boiling point 80° C.), and Perfluorooctane (boiling point 102° C.) made by Japan Zeon Co., Ltd., hydrofluoropolyether such as product names H-GALDEN-ZV75 (boiling point 75° C.), H-GALDEN-ZV85 (boiling point 85° C.), H-GALDEN-ZV100 (boiling point 95° C.), H-GALDEN-C (boiling point 130° C.), H-GALDEN-D (boiling point 165° C.) or perfluoropolyether such as product name SV-110 (boiling point 110° C.), SV-135 (boiling point 135° C.) made by Ausimont Co., Ltd., perfluoroalkane such as product name FC series made by Sumitomo 3M Co., Ltd. and the like are available.

When it is intended to obtain an organic film having an uniform film thickness, it is preferable to select from the above fluorinated hydrocarbon based solvents that have a melting point of 70 to 240° C., and further to select hydrofluoropolyether (HFPE) or hydrofluorocarbon (HFC) as the solvent dissolving the alkoxysilane compound represented by the above general formulas (1) and (2), thereby using one selected from these or two or more in a mixed manner. If the boiling point is too low, drying occurs during transfer in a gravure printing process, resulting in coating unevenness. On the other hand, if the boiling point is too high, drying does not proceed well, causing the coating to be badly formed. The HFPE or HFC has an excellent resolvability with respect to the alkoxysilane compound represented by the above general formulas (1) and (2), so that an excellent coating surface can be obtained.

While the degree with which the alkoxysilane compound represented by the above general formulas (1) and (2) is diluted with a dilution solvent for the preparation of the composition for surface modification film, is not limited, a concentration of about 0.01 to 200 g/L is adequate for preparation of the coating solution, for example. In this case, an alcohols solvent, a hydrocarbons solvent or the like may be mixed, as needed, with the fluorinated hydrocarbon based solvent.

Further, it is possible to add, as a catalyst, acid or base to the coating solution as needed. As an acid catalyst, for example, sulfuric acid, hydrochloric acid, nitric acid, phosphoric acid, acid clay, iron oxide, boric acid, trifluoroacetic acid or the like may be used. As a base catalyst, alkali metal hydroxide, such as sodium hydroxide, potassium hydroxide, lithium hydroxide may be used. In this case, it is preferable to add the catalyst at a concentration of about 0.001 to 1 mmol/L. In addition to these acids and bases, a carbonyl compound like a phosphate ester-based catalyst or acetylacetone may be added to the coating solution, thereby accelerating a reaction.

By adding the catalyst as describe above, interaction with a ligation reaction between the alkoxysilane compound represented by the above general formulas (1) and (2) and the protective film 26 of the fingerprint reading sensor 14 proceeds excellently without the application of heat. The carbonyl compound may be added at a concentration of about 0.1 to 100 mmol/L.

EXAMPLE

In the example, the two fingerprint matching processors 10 having the protective films 26 are prepared. One has the protective film 26 coated with the water repellent film 30, and the other has the protective film 26 without being coated with the water repellent film 30. Each of the fingerprint reading sensors 14 of the fingerprint matching processors 10 detected two patterns of waveforms; one was obtained when the finger was placed normally on the sensor surface; and the other was obtained when the finger was once placed on the sensor surface to attach the foreign matter M thereto. Comparison was made between the two cases for the two fingerprint matching processors 10.

At the same time, in the fingerprint matching processor 10 coated with the water repellent film 30, the endurance of the water repellent film 30 was examined. More specifically, another comparison was made between the above two cases after the two processes of striking the water repellent film 30 with a rubber jig 100,000 times at a force of 600 g, and actually placing the finger 9000 times on the water repellent film 30. Thus, the endurance of the water repellent film 30 was tested.

Each of the protective films 26 of the fingerprint matching processors 10 used in the example is formed using silicon nitride by a spin coating method such that the film thickness thereof becomes several μm.

Figure 7B:
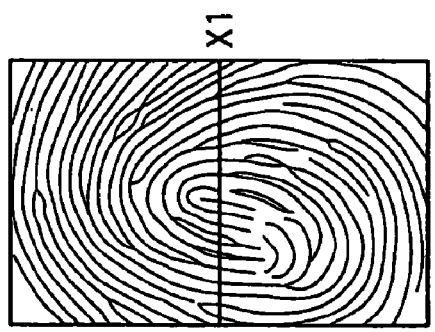
FIG. 7B shows the fingerprint obtained from the placed finger.
Figure 7A:
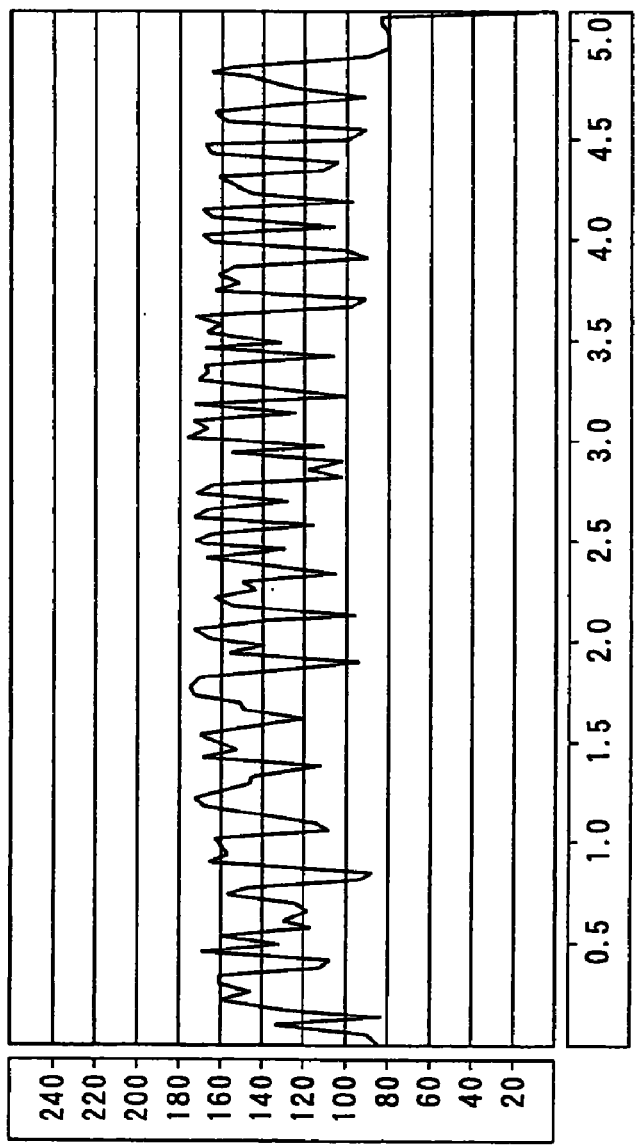
FIG. 7A shows a waveform detected by the fingerprint reading sensor in the case of placing a finger on the protective film that is not with a water repellent film.

First, experimental results obtained when the water repellent film 30 is not coated on the protective film 26 are shown in FIGS. 7A and 8A.

FIG. 7A shows a waveform of an electrical signal detected by the fingerprint reading sensor 14 in the case of placing the finger on the protective film 26 that is not coated with water repellent film 30. As a result of reading the fingerprint along the line XI shown in FIG. 7B, the waveform shown in FIG. 7A is obtained.

In FIG. 7A, a signal level of "80" denotes that the sensor surface of the fingerprint reading sensor 14 is exposed to air, that is, nothing is placed on the protective film 26. On the other hand, a signal level of "180" denotes that water is present on the fingerprint reading sensor 14, that is, on the protective film 26. The signal level denotes the same meaning through FIGS. 8A, 9A, 10A, 11A, and 12A to be described later.

FIG. 8A shows a waveform of an electrical signal detected by the fingerprint reading sensor 14 in the case where the finger is once placed on the protective film 26 that is not coated With water repellent film 30, then lifted off, and breath is blown against the film 30. As a result of reading the fingerprint along the line X2 shown in FIG. 8B, the waveform shown in FIG. 8A is obtained.

Although the amplitude of the waveform shown in FIG. 8A is smaller than that shown in FIG. 7A, the signal level range is centered within a range of about 120 to 160, which substantially corresponds to the signal level range shown in FIG. 7A (100 to 170). Accordingly, the LSI for fingerprint matching 15 erroneously executes the finger matching process using the electrical signal caused by the electric charge of the foreign matter M on the protective film 26.

Next, experimental results obtained when the water repellent film 30 is coated on the protective film 26 will be described. The water repellent film 30 is formed on the protective film 26 in the following manner.

(1) Preparation of Coating Solution Containing Alkoxysilane Compound Having Perfluoropolyether Group An alkoxysilane compound (compound 1 shown in Table 1 having an average molecular weight of 4,000) was synthesized from a perfluoropolyether compound (average molecular weight: 4,000) whose terminals were esterified with alcohols. Two parts by weight of the perfluoropolyether compound were dissolved in two hundred parts by weight of hydrofluoropolyether (boiling point: 178° C., product name: H-GALDEN-D, made by Ausimont Co., Ltd.), followed by being filtered with a membrane filter. In this manner, the coating solution was obtained.

(2) Coating and Drying 0.2 ml of the coating solution prepared in the step (1) was dropped on the horizontalized protective film 26 of the fingerprint matching processor 10. After settling for several seconds until the dropped coating solution spread over the entire surface of the protective film 26, the fingerprint matching processor 10 was tilted for removal of the extra fluid, followed by drying the solution at room temperature (25° C., 50% RH (Relative Humidity)).

TABLE 1

| Compound | Average molecular weight | Constitutional formula |
|---|---|---|
| Compound 1 | 4,000 | $_2(_3(_3HC_2HCO)SiC_3H_6NHCO)$—$R_f$-<br>$R_f$ is —$CH_2CF_2(OC_2F_4)p\ (OCF_2)qOCF_2$— |

The water repellent film 30 coated on the protective film 26 was (A) struck with a rubber jig 100,000 times at a force of 600 g or (B) touched actually by the finger 9,000 times. The result obtained when the finger was placed on the water repellent film 30 and the result obtained when the foreign matter M adhering to the water repellent film 30, which had been detected by the fingerprint reading sensor 14, were compared between the above two cases.

Figure 9B:
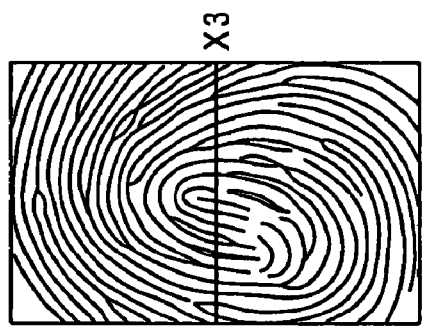
FIG. 9B shows the fingerprint obtained from the placed finger.
Figure 9A:
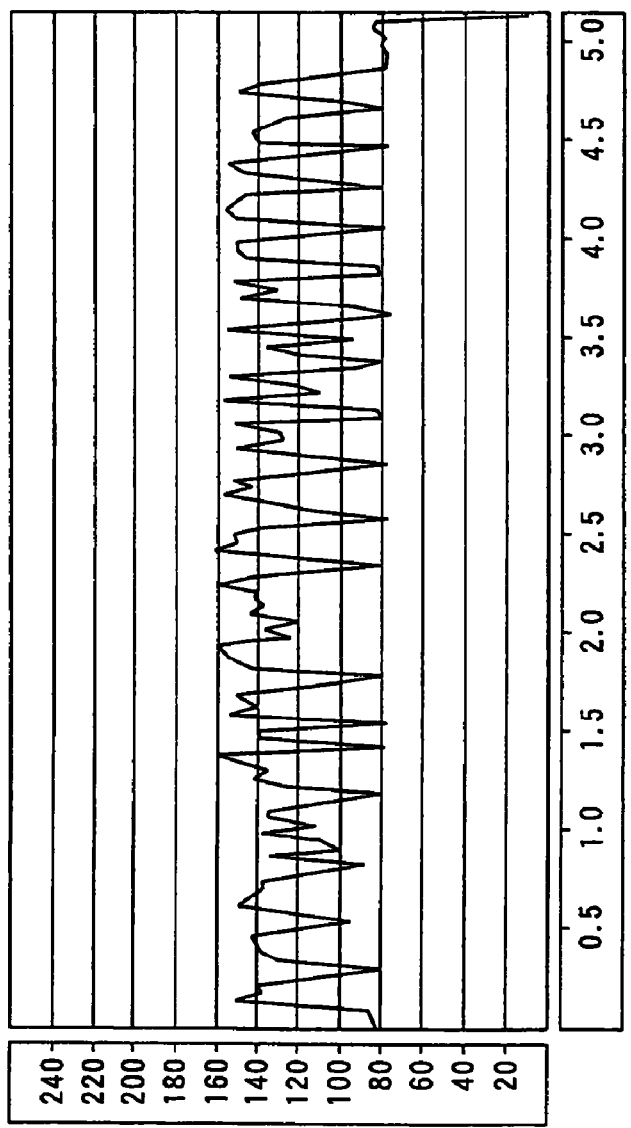
FIG. 9A shows a waveform detected by the fingerprint reading sensor in the case where a finger is placed on the water repellent film coated on the protective film.

Case (A): Striking Water Repellent Film 30 with Rubber Jig 100,000 Times at Force of 600 g FIG. 9A shows a waveform of an electrical signal detected by the fingerprint reading sensor 14 in the case where the finger is placed on the water repellent film 30, which has been struck with a rubber jig 100,000 times at a force of 600 g. As a result of reading the fingerprint along the line X3 shown in FIG. 9B, the waveform shown in FIG. 9A is obtained.

FIG. 10A shows a waveform of an electrical signal detected by the fingerprint reading sensor 14 in the case where the finger is once placed on the water repellent film 30, which has been struck with a rubber jig 100,000 times at a force of 600 g, then the finger is lifted off, and breath is blown against the film 30. As a result of reading the fingerprint along the line X4 shown in FIG. 10B, the waveform shown in FIG. 10A is obtained.

The amplitude of the waveform shown in FIG. 10A is smaller than that shown in FIG. 9A. In addition, the signal level range is centered within a range of about 80 to 120, which substantially corresponds to the signal level obtained when the water repellent film 30 is exposed to air (in the vicinity of 80), that is, nothing is placed on the water repellent film 30. This prevents the LSI for fingerprint matching 15 from erroneously executing the fingerprint matching process. Further, it can be found that the water repellent film 30 formed on the protective film 26 achieves the desired effect even after being struck with a rubber jig 100,000 times at a force of 600 g.

Case (B): Actually Placing Finger 9,000 Times on Water Repellent Film 30

Figure 11B:
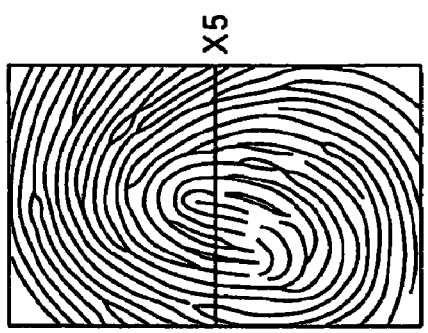
FIG. 11B shows the fingerprint obtained from the placed finger.
Figure 11A:
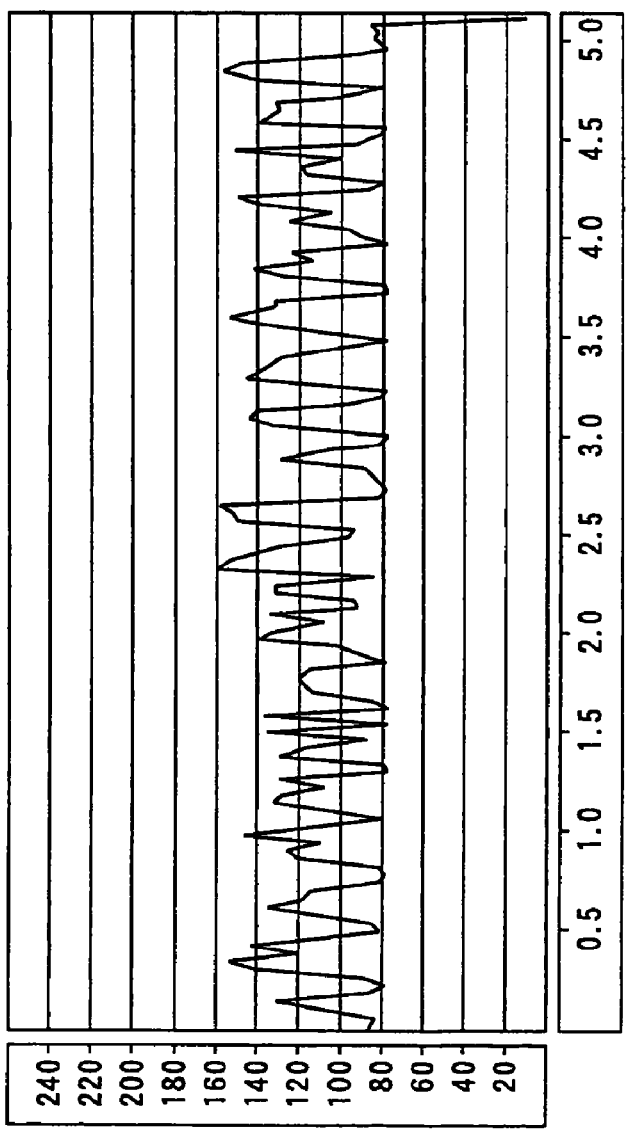
FIG. 11A shows a waveform detected by the fingerprint reading sensor in the case where the finger is placed on the water repellent film coated on the protective film.

FIG. 11A shows a waveform of an electrical signal detected by the fingerprint reading sensor 14 in the case where the finger is placed on the water repellent film 30 on which the finger has actually been placed 9,000 times. As a result of reading the fingerprint along the line X5 shown in FIG. 11B, the waveform shown in FIG. 11A is obtained.

Figure 12B:
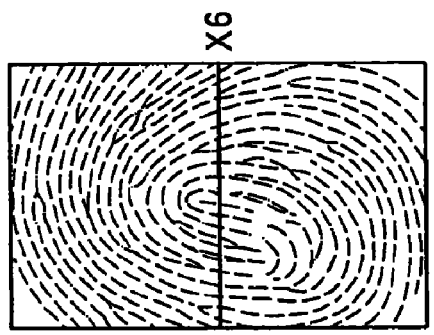
FIG. 12B shows the foreign matter adhering to the water repellent film.
Figure 12A:
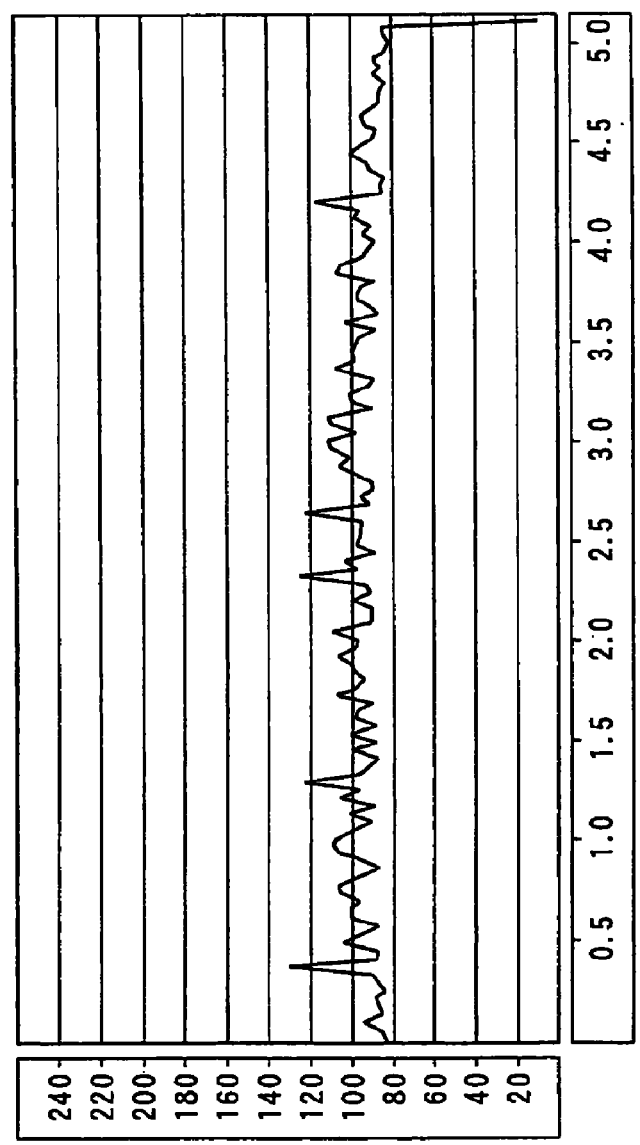
FIG. 12A shows a waveform detected by the fingerprint reading sensor in the case of blowing breath against the foreign matter adhering to the water repellent film coated on the protective film.

FIG. 12A shows a waveform of an electrical signal detected by the fingerprint reading sensor 14 in the case where the finger is placed on the water repellent film 30 on which the finger has actually been placed 9,000 times, then lifted off, and breath is blown against the film 30. As a result of reading the fingerprint along the line X6 shown in FIG. 12B, the waveform shown in FIG. 12A is obtained.

The amplitude of the waveform shown in FIG. 12A is smaller than that shown in FIG. 11A. In addition, the signal level range is centered within a range of about 80 to 120, which substantially corresponds to the signal level obtained when the water repellent film 30 is exposed to air (in the vicinity of 80), that is, nothing is placed on the water repellent film 30. This prevents the LSI for fingerprint matching 15 from erroneously executing the fingerprint matching process. Further, it can be found that the water repellent film 30 formed on the protective film 26 achieves the desired effect even after being actually touched by the finger 9,000 times.

By forming, in this manner, the water repellent film 30 made of the alkoxysilane compound represented by the above general formulas (1) and (2) on the protective film 26, which is made of silicon nitride, of the fingerprint reading sensor 14 of the fingerprint matching processor 10, it possible to prevent illegal fingerprint matching with a simple method and execute the fingerprint matching process with excellent safety and certainty.

Further, as can be appreciated from the excellent durability of the water repellent film 20, the adhesiveness between the silicon nitride constituting the protective film 26 and alkoxysilane compound is very high.

What is claimed is:

1. A fingerprint matching processor comprising:
   a fingerprint reading sensor having a water repellent film, a protective film, and sensor electrodes,
   wherein said protective film is between said water repellent film and said sensor electrodes, said sensor electrodes being between said protective film and a silicon substrate,
   wherein a resin mold portion encircles said protective film and said sensor electrodes, said mold portion being of a material differing from said protective film,
   wherein said mold portion is in contact with said water repellent film, said protective film, said sensor electrodes, and silicon substrate.

2. A fingerprint matching processor comprising:
   a protective film between a water repellent film and sensor electrodes, said sensor electrodes being a ground electrode and detection electrodes;
   a resin in contact with said protective film and said ground electrode, said resin being of a material differing from said protective film.

3. The fingerprint matching processor according to claim 2, wherein said resin encircles said protective film and said sensor electrodes.

4. The fingerprint matching processor according to claim 2, wherein said resin is in contact with said water repellent film.

5. The fingerprint matching processor according to claim 2, wherein said protective film is in contact with said water repellent film.

6. The fingerprint matching processor according to claim 2, wherein said sensor electrodes are in contact with said protective film.

7. The fingerprint matching processor according to claim 2, wherein said sensor electrodes are between said protective film and a silicon substrate.

8. The fingerprint matching processor according to claim 7, wherein said sensor electrodes are on said silicon substrate through an interlayer film.

9. The fingerprint matching processor according to claim 7, wherein said resin is in contact with said silicon substrate.

10. The fingerprint matching processor according to claim 9, wherein said protective film is in contact with said water repellent film.

11. The fingerprint matching processor according to claim 2, wherein said ground electrode is disposed in a lattice form, said ground electrode separating one of the detection electrodes from another of the detection electrodes.

12. The fingerprint matching processor according to claim 2, wherein said ground electrode separates one of said detection electrodes from another of said detection electrodes.

13. The fingerprint matching processor according to claim 2, wherein said protective film is a material from the group consisting of silicon nitride and Diamond Like Carbon.

14. The fingerprint matching processor according to claim 13, wherein said material for said protective film is said silicon nitride.

15. The fingerprint matching processor according to claim 13, wherein said material for said protective film is said Diamond Like Carbon.

16. The fingerprint matching processor according to claim 2, wherein said water repellent film is formed by using an alkoxysilane compound having a perfluoropolyether group represented by the following general formula (1);

where $R_f$ denotes a perfluoropolyether group, $R^1$ denotes O or NH or S, $R^2$ denotes an alkylene group, $R^3$ denotes an alkyl group, and j denotes 1 or 2.

17. The fingerprint matching processor according to claim 16, wherein said water repellent film is formed by using an alkoxysilane compound having a perfluoropolyether group represented by the following general formula (2) obtained with j in the general formula (1) being 2;

where $R_f$ denotes a perfluoropolyether group; $R^1$ denotes O or NH or S; $R^2$ denotes an alkylene group; and $R^3$ denotes an alkyl group.

18. The fingerprint matching processor according to claim 2, wherein said detection electrodes are arranged in the two-dimensional matrix, a pitch of said detection electrodes being finer than a pitch between a pit and projection of a finger.

19. The fingerprint matching processor according to claim 18, wherein a target object is said finger placed on said water repellent film, differences in electrostatic capacity accumulated between pits and projections of said finger being detectable.

20. The fingerprint matching processor according to claim 19, wherein said differences in electrostatic capacity is an image, a result being a comparison between template data and said image.

21. The fingerprint matching processor according to claim 20, wherein said result is transferable to an external device.

22. The fingerprint matching processor according to claim 21, further comprising:
   flash memory configured to store said template data; and
   memory configured to store a program, said program being executable.

23. The fingerprint matching processor according to claim 21, further comprising:
   an interface controller configured to control an I/O interface,
   wherein information is transferable between said I/O interface and said external device, said information including said result.

* * * * *